US011109544B2

United States Patent
Gerdes et al.

(10) Patent No.: US 11,109,544 B2
(45) Date of Patent: Sep. 7, 2021

(54) SYSTEM, METHOD AND APPARATUS FOR SPRAYING THE LEAF AND ROOT AREAS OF PLANTS

(71) Applicant: Valmont Industries, Inc., Omaha, NE (US)

(72) Inventors: Jerry Gerdes, Omaha, NE (US); Jacob L. LaRue, Omaha, NE (US); Andrew T. Olson, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 120 days.

(21) Appl. No.: 16/364,660

(22) Filed: Mar. 26, 2019

(65) Prior Publication Data

US 2019/0297796 A1 Oct. 3, 2019

Related U.S. Application Data

(60) Provisional application No. 62/649,435, filed on Mar. 28, 2018, provisional application No. 62/649,619, filed on Mar. 29, 2018.

(51) Int. Cl.
*A01G 25/09* (2006.01)
*A01G 25/16* (2006.01)
*A01G 25/02* (2006.01)

(52) U.S. Cl.
CPC .......... *A01G 25/092* (2013.01); *A01G 25/02* (2013.01); *A01G 25/16* (2013.01)

(58) Field of Classification Search
CPC ...... A01G 25/092; A01G 25/16; A01G 25/02; A01G 25/167
See application file for complete search history.

(56) References Cited

U.S. PATENT DOCUMENTS

| | | | |
|---|---|---|---|
| 3,210,917 A | 10/1965 | John et al. | |
| 3,381,893 A | 5/1968 | Smith et al. | |
| 3,446,434 A | 5/1969 | Smith, Jr. et al. | |
| 4,121,767 A * | 10/1978 | Jensen | A01M 7/0092 137/92 |
| 4,354,636 A | 10/1982 | Hait | |
| 4,405,085 A | 9/1983 | Meyer | |
| 4,828,177 A | 5/1989 | Schuitemaker | |
| 4,892,256 A | 1/1990 | Brown et al. | |

(Continued)

FOREIGN PATENT DOCUMENTS

| | | |
|---|---|---|
| CN | 203378366 U | 1/2014 |
| WO | 1999016296 A1 | 4/1999 |

*Primary Examiner* — Qingzhang Zhou
(74) *Attorney, Agent, or Firm* — Milligan PC LLO

(57) ABSTRACT

The present invention provides a system, method and apparatus for spraying the leaf and root areas of plants. According to an exemplary preferred embodiment, the present invention provides a foliar chemical application package which is designed specifically to deliver a chemical solution to the leaf area of plants in which the chemical will primary enter the plant through the foliar area rather than the root zone. According to a further preferred embodiment, the present invention teaches a system, method and apparatus for providing a specialized foliage spraying application in which water supply lines and chemical supply lines are individually controlled so that applicants, such as different chemicals received from different chemical tanks, may be simultaneously applied to a given crop.

18 Claims, 7 Drawing Sheets

(56) References Cited

U.S. PATENT DOCUMENTS

| | | | |
|---|---|---|---|
| 5,246,164 A | 9/1993 | McCann et al. | |
| 5,709,343 A | 1/1998 | Myers | |
| 5,779,163 A | 7/1998 | Gunter | |
| 5,927,603 A | 7/1999 | McNabb | |
| 5,937,489 A | 8/1999 | Gunter | |
| 6,293,475 B1 | 9/2001 | Sobolik | |
| 7,051,952 B2 | 5/2006 | Drechsel | |
| 8,035,403 B1 | 10/2011 | Campbell et al. | |
| 8,353,470 B2 | 1/2013 | Sinden et al. | |
| 8,942,893 B2 | 1/2015 | Rosa et al. | |
| 2001/0035468 A1 | 11/2001 | Cruz et al. | |
| 2007/0220808 A1* | 9/2007 | Kaprielian | A01G 27/003 47/48.5 |
| 2008/0046130 A1 | 2/2008 | Faivre et al. | |
| 2012/0048972 A1 | 3/2012 | Neto | |
| 2013/0223934 A1 | 8/2013 | Veitsman et al. | |
| 2017/0305804 A1* | 10/2017 | Ayers | C05G 5/20 |

\* cited by examiner

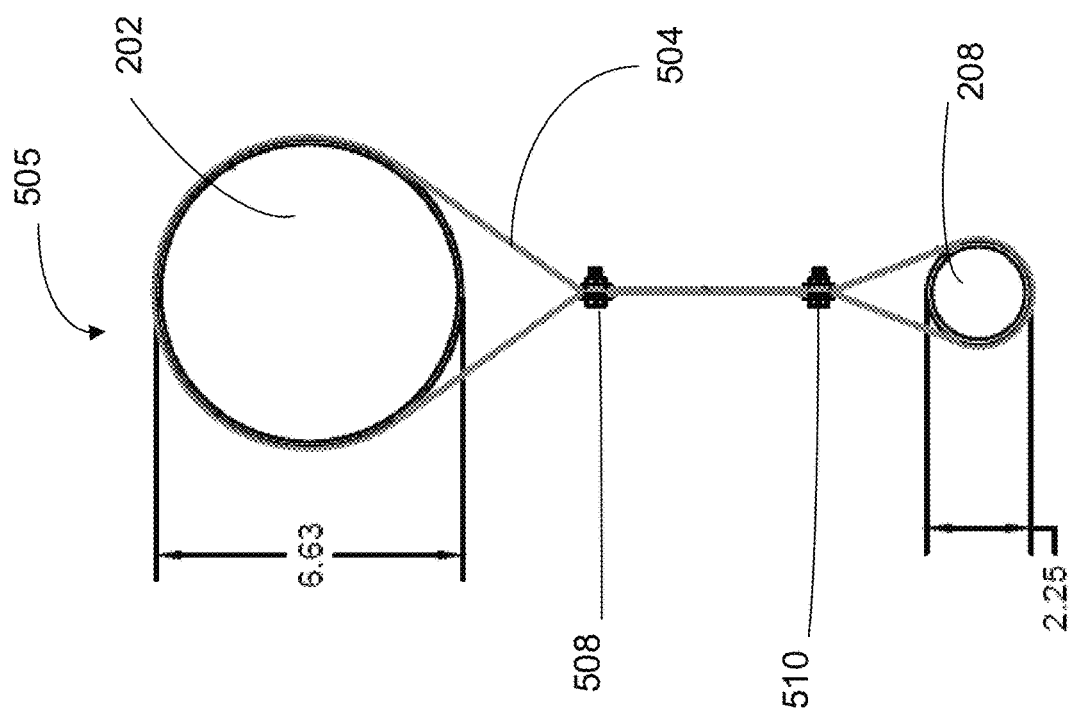
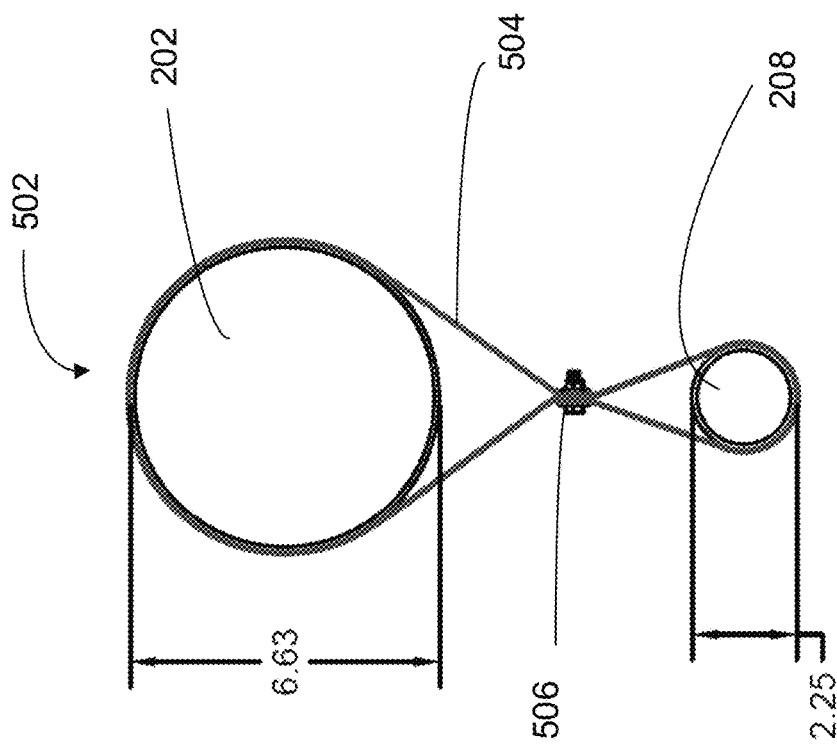

SYSTEM, METHOD AND APPARATUS FOR SPRAYING THE LEAF AND ROOT AREAS OF PLANTS

RELATED APPLICATIONS

The present application claims priority to U.S. Provisional Application No. 62/649,435 filed Mar. 28, 2018 and to U.S. Provisional Application No. 62/649,619 filed Mar. 29, 2018.

BACKGROUND AND FIELD OF THE PRESENT INVENTION

Field of the Present Invention

The present invention relates generally to irrigation machines and, more particularly, to a system, method and apparatus for spraying the leaf and root areas of plants.

BACKGROUND OF THE INVENTION

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e. a well or water line). The essential function of an irrigation machine is to apply an applicant (i.e. water or other solution) to a given location.

In most cases, a mechanized irrigation machine's primary purpose has been applying water for irrigation. Accordingly, mechanized irrigation machines are primarily designed for transport and for efficiently delivering water to a soil surface for uptake by root systems. In some cases, growers are able to apply certain chemicals through the irrigation water that are beneficial. However, there are many limitations to the effectiveness and efficiency of applying a variety of chemicals by traditional means. For example, by utilizing the existing irrigation plumbing, chemical application cannot be applied at higher concentrations and must be diluted in order to increase the application volume to be compatible with the irrigation sprinklers. Secondly, the chemicals are applied broadly across the cultivation area in the same manner as the irrigation water. In many cases, this type of broad application is wasteful as chemical applications must generally be more focused or applied in a different way for effective treatment. Finally, irrigation sprinklers are not designed to apply the fine mist and low flowrates required for leaf adherence of chemicals applied by foliar application.

In order to overcome the limitations of the prior art, a system is needed which is able to effectively apply chemicals utilizing irrigation machines without compromising the ability of the irrigation machines to apply irrigation water effectively and efficiently.

SUMMARY OF THE DISCLOSURE

To minimize the limitations found in the prior art, and to minimize other limitations that will be apparent upon the reading of the specifications, the present invention provides a system, method and apparatus for spraying the leaf and root areas of plants with specialized equipment mounted on, but fluidly separate from the irrigation machine.

According to an exemplary preferred embodiment, the present invention provides a foliar chemical application package which is designed specifically to deliver a chemical solution to the leaf area of plants in which the chemical will primarily enter the plant through the foliar area and/or root ball rather than generalized absorption from the irrigated soil.

According to a further preferred embodiment, the present invention teaches a system, method and apparatus for providing a specialized foliage spraying application in which water supply lines and chemical supply lines are individually controlled so that applicants, such as water, or different chemicals received from different chemical tanks, may be simultaneously or separately applied to a given crop.

According to further preferred embodiments, brackets may attach chemical transmission lines to water pipelines. Still further, the system preferably may be configured to allow for a complete flush/evacuation of dedicated chemical lines to purge each pipe of chemicals following an application. According to further preferred embodiments, the dedicated chemical transmission lines and distribution sprayers/ emitter/drops may preferably be formed of materials which are resistant to chemical and UV exposure.

BRIEF DESCRIPTION OF THE DRAWINGS

FIGS. 5A-5B show two exemplary connection systems in accordance with preferred embodiments of the present invention.

DESCRIPTION OF THE PREFERRED EMBODIMENTS

Figure 1A:
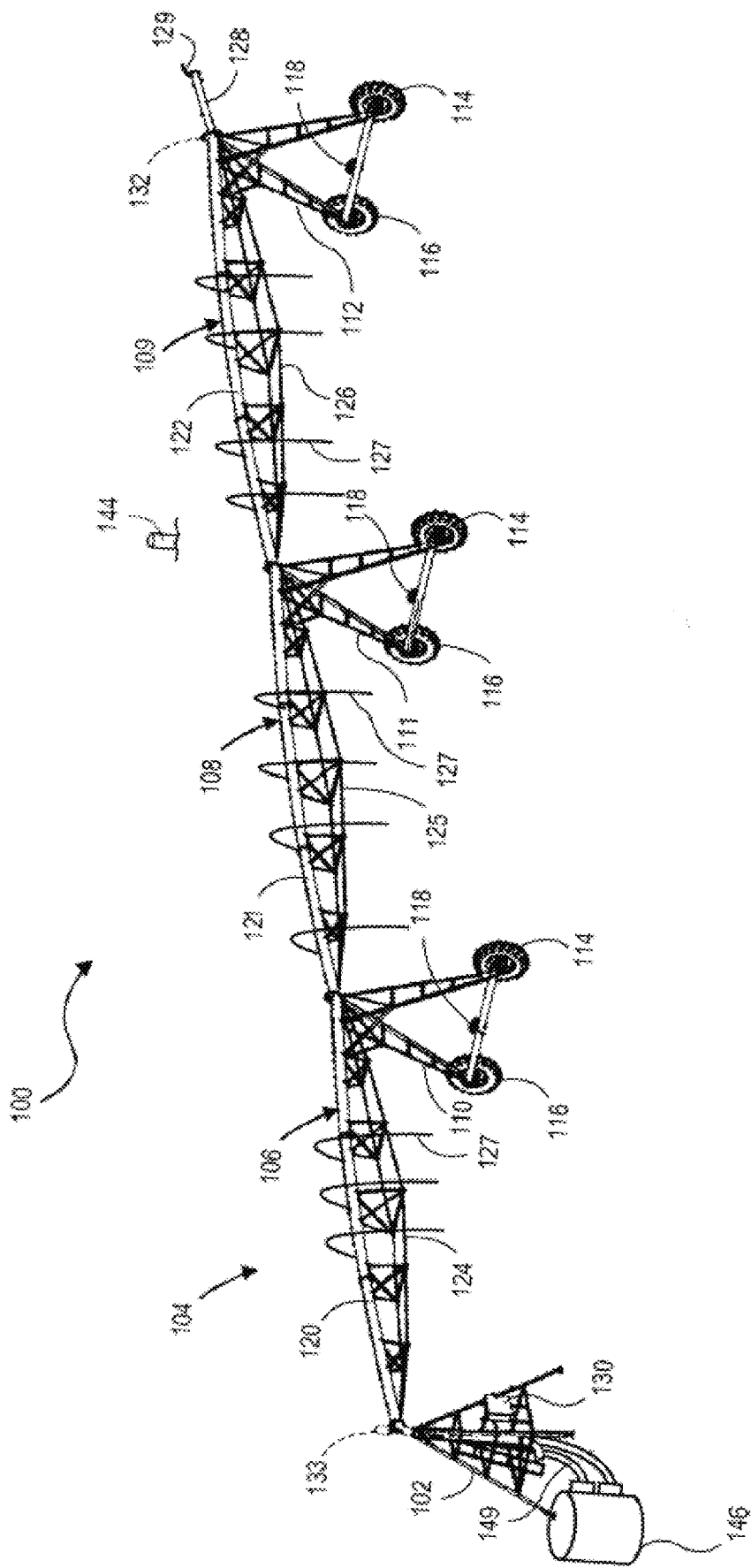
FIG. 1A shows an exemplary irrigation system for use with the present invention.

Reference is now made in detail to the exemplary embodiments of the present invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom and that maintain the data stored to allow the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), mixed analog and digital, and the like.

FIG. 1A illustrates a self-propelled (e.g., mechanized) irrigation system (assembly) 100 in accordance with example implementations of the present disclosure. Examples of self-propelled irrigation systems include a center pivot irrigation system, a linear move irrigation system, or the like. FIG. 1A illustrates an embodiment of the present disclosure where the irrigation system 100 is a center pivot irrigation system.

However, it is contemplated that the present disclosure may be implemented in other self-propelled irrigation systems (e.g., linear move irrigation systems). As shown, the system 100 includes a center pivot structure 102, a main section assembly 104 (irrigation section assembly) coupled (e.g., connected) to the center pivot structure 102. The center pivot structure 102 has access to a well, a water repository (e.g., water tank), or other fluid source, to furnish water to the irrigation system 100. For instance, the well may be located under the center pivot structure 102. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be a combination of water and additives (e.g. chemicals, pesticides, fertilizers, microbes, biologics, water, other mixtures and the like) for irrigating a cultivation area. The irrigation system 100 may be coupled to a fluid displacement device (e.g., a pump assembly) configured to furnish water throughout the irrigation system 100. For example, the fluid displacement device may assist in displacing fluid from the fluid source (e.g., well, water repository, etc.) to the conduit portions of the irrigation system which are described herein. The center pivot structure 102 can be fixed or can be towable such that an operator can move the irrigation system 100 from one field to another. In an implementation, the center pivot structure 102 may comprise a frame assembly (e.g., galvanized steel frame assembly, and so forth).

The main section assembly 104 includes several interconnected spans 106, 108, 109 (e.g., irrigation spans) supported by one or more tower structures 110, 111 (intermediate tower structures) and an end tower structure 112. The tower structures 110, 111, 112 may be any tower configuration known in the art to adequately support the conduits (e.g., water pipe sections) described herein. It is understood that the section assembly 104 may include any number of spans and tower structures.

The tower structures 110, 111 and the end tower structure 112 each include wheels 114, 116, to assist in traversing the irrigation system 100 (e.g., allowing the main section assembly 104 to pivot) about a cultivation area (e.g., field). In an implementation, the wheels 114, 116 may be driven by a suitable drive unit 118 (e.g., drive motor), or the like, to assist in traversing the system 100 about the specified area. For example, each tower structure 110 may include a drive unit 118 to propel the respective tower structure 110, 111, 112 (and the irrigation system 100) through the cultivation area.

As shown in FIG. 1A, each span 106, 108 includes conduits 120, 121, 122 (e.g., pipes) that carry (e.g., transport, provide, and so forth) liquid (e.g., applicant) along the length of the system 100 to one or more applicant dispersal assemblies that irrigate the cultivation area. Each conduit 120, 121, 122 may be coupled to one another to allow fluid communication between each conduit. In an implementation, the conduits 120, 121, 122 may be supported by truss-type framework structures 124, 125, 126. Thus, the main fluid displacement device may displace applicants through the conduits 120, 121, 122, which is then dispersed by the dispersal devices 127, which are coupled to the conduits 120, 121, 122. As shown in FIG. 1A, the irrigation system 100 also includes a cantilevered boom structure 128 that extends outwardly from the end tower structure 112. In one or more implementations, the cantilevered boom 128 includes an end gun 129 (e.g., end gun 129 is mounted to the cantilevered boom 128). The end gun 129 may be a suitable pressure sprayer which can be activated at the corners of a field, or other designated areas, to increase the amount of land that can be irrigated.

Figure 1B:
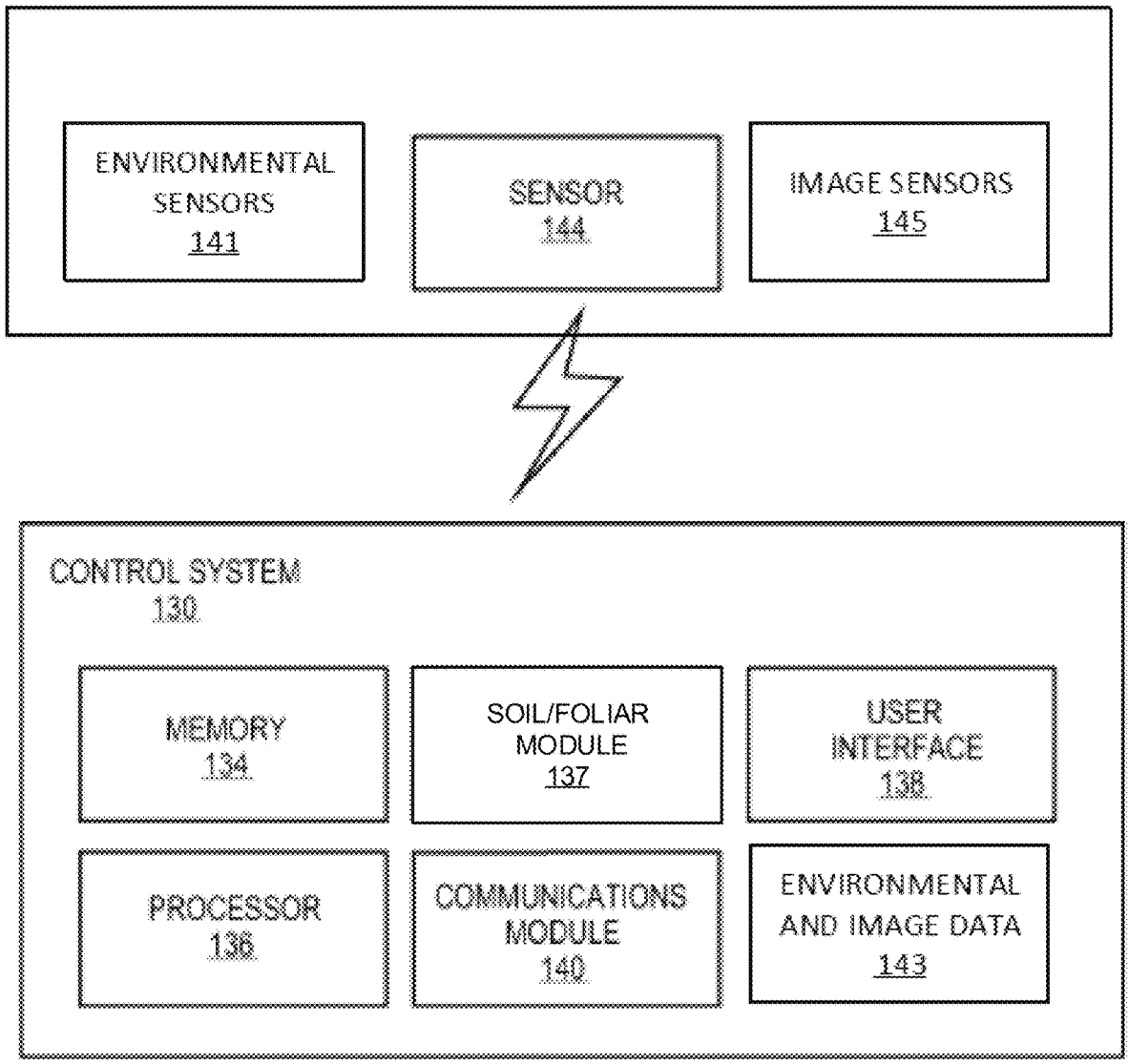
FIG. 1B shows an exemplary control system for use with the present invention.

As shown in FIGS. 1A and 1B, the irrigation system 100 also preferably includes a control system 130 that is in electronic communication with one or more components of the system 100. For example, the control system 130 may be in electronic communication with one or more tower boxes mounted at one or more tower structures 110, 111, 112, and a position sensor 132 utilized to determine an approximate position of the irrigation system (e.g., determining the approximate position of the end tower structure 112 within the cultivation area with respect to the center pivot structure 102). In an implementation, the position sensor 132 may be a GPS sensor (e.g., GPS receiver), or the like, mounted to the end tower structure 112 which can transmit signals representing the position of the end tower structure to the control system 130. As described herein, the control system 130 may preferably determine the radial position of the main section assembly 104 with respect to the center pivot structure 102. In another implementation, the position sensor may be an angle sensor 133 which can facilitate determination of the rotational position of the main section assembly 104. The angle sensor 133 may be mounted to the center pivot structure 102 to assist in determining the rotational position of the main section assembly 104.

In an implementation, the control system 130 is mounted to the central pivot structure 102, a control cart, or a tower structure 110, 111, 112. The control system 130 is generally located on the structural element of the irrigation system 100 where the applicant/water is introduced into the irrigation system; however, other configurations known in the art are within the scope of the present disclosure.

The control system 130 may preferably monitor operating conditions and may control various functions of the irrigation system 100. In certain implementations, the control system 130 actively monitors the irrigation system's 100 function and performance including, but not limited to: a position of one or more conduit sections 120, 121, 122 or tower structures 110, 111, 112 (e.g., the position of the main section assembly 104), whether the irrigation system 100 is powered on or off, a voltage parameter associated with the irrigation system 100, a motor speed parameter associated with the irrigation system 100, an approximate ground speed parameter associated with the irrigation system 100, a direction parameter associated with the irrigation system 100, a diagnostic parameter associated with the irrigation system 100, whether the applicant is being supplied to the irrigation system 100 (e.g., whether the fluid displacement device is operational), whether the Stop in Slot (SIS) is powered on or off, an applicant pressure associated with the irrigation system 100, a time parameter, a date parameter, a field position parameter of the irrigation system components, end-gun status, and whether the programs (e.g., software programs, etc.) are running properly.

The control system 130 also controls the irrigation system 100's functions and settings including, but not limited to: start and stop, selectively powering the main fluid displacement device, an applicant application depth parameter, the direction of travel associated with the irrigation system 100, selectively powering the SIS, automatically reversing or stopping the irrigation system 100, automatically restarting the irrigation system 100, providing an operator auxiliary control to the system 100, writing and editing irrigation programs (e.g., irrigation software programs), and controlling sector and sequential programs (e.g., software programs). In another implementation, the control system 130 may cause an alert to be issued to the operator if there are any errors in the operation of the irrigation system 100 or if any of the functions or conditions monitored by the control system 130 have been compromised (e.g., ceased operation or are outside an acceptable range).

With reference now to FIG. 1B, the control system 130 may be accessed through an interface 138 housed within a weather-proof box or may be remotely linked. As shown in FIG. 1B, the control system 130 includes at least a memory 134 to store one or more software programs (e.g., software modules), a processor 136 communicatively coupled to the memory 134, a user interface 138 (e.g., graphical user interface, etc.), and a communications module 140 (e.g., transmitter, receiver, transceiver, etc.). The memory 134 is an example of tangible computer-readable media that provides storage functionality to store various data associated with the operation of the control system 130, such as software programs/modules and code segments mentioned herein, or other data to instruct the processor 136 to perform the steps described herein. As shown, the control system 130 includes a soil/foliar module 137, which is storable in the memory 134 and executable by the processor 136. The soil/foliar module 137 is representative of functionality to cause the dispersal of a chemical mixtures, additives and the like from the irrigation system 100, as described in greater detail below. The user interface 138 may preferably receive one or more user-defined parameters (user-defined inputs) for operating the irrigation system 100. Further, the control system 130 may include a module 143 for receiving and processing environmental data (e.g. weather) and image data. Preferably, the environmental and image data may be received from environmental sensors 141 and image sensors 145 which may be integrated with the irrigation system or remote linked.

According to alternative embodiments, the environmental sensors 141 may include weather sensors or the like to measure weather features such as humidity, pressure, precipitation, solar radiation, temperature and the like. Further, image sensors 145 may include a range of sensing elements including spectrometers, infrared sensors and optical sensors/cameras to detect crop health, crop water use, crop water stress index, plant production ratio and provide data to calculate other crop indices. According to a still further for environment, the image sensors 145 may detect and/or obtain data to produce NDVI, EVI and a variety of other indices. Further, such data may be produced via an airborne sensor or satellite and transmitted to the control system.

As shown in FIG. 1A, the irrigation system 100 may preferably be within an agricultural field and function to disperse an applicant to the field. The field may include one or more sensors 141, 144, 145 deployed within the field and/or mounted on the irrigation system 100. The sensors 141, 144, 145 may preferably communicatively interface with the control system 130. For example, the sensors 141, 144, 145 may be communicatively connected to the control system 130 via one or more in-ground wires. In another example, the sensors 141, 144, 145 may be communicatively connected to the control system 130 via a wireless communication network (i.e., communicatively connected with the communications module 140). In this example, the sensors 141, 144, 145 may preferably transmit one or more wireless signals to the control system 130, as described in greater detail herein.

In one or more implementations, the sensors 141, 144, 145 may include moisture sensors and/or microbe sensors. The image sensors 145 in particular may monitor crop health using imaging and spectral analysis (such as RGB and/or spectrophometric images). The soil/foliar module 137 (as discussed further below) may preferably use this imaging to scan foliage and identify crop type, presence of weeds or pests, overall crop health and crop growth states.

The irrigation system 100 further includes one or more repositories 146 that are in fluid communication with the conduits 120, 121, 122 (i.e., the main section assembly 104). In one or more implementations, the repositories 146 may include storage tanks for storing and providing chemicals (including pesticides, herbicides, fertilizers and the like) and additives (e.g. chemicals, microbes, biologics, water, other mixtures and the like). As discussed in more detail below with respect to FIG. 3, the repositories 146 may preferably be in fluid communication with the irrigation system 100 via a system of inlet conduits 149.

Figure 2:
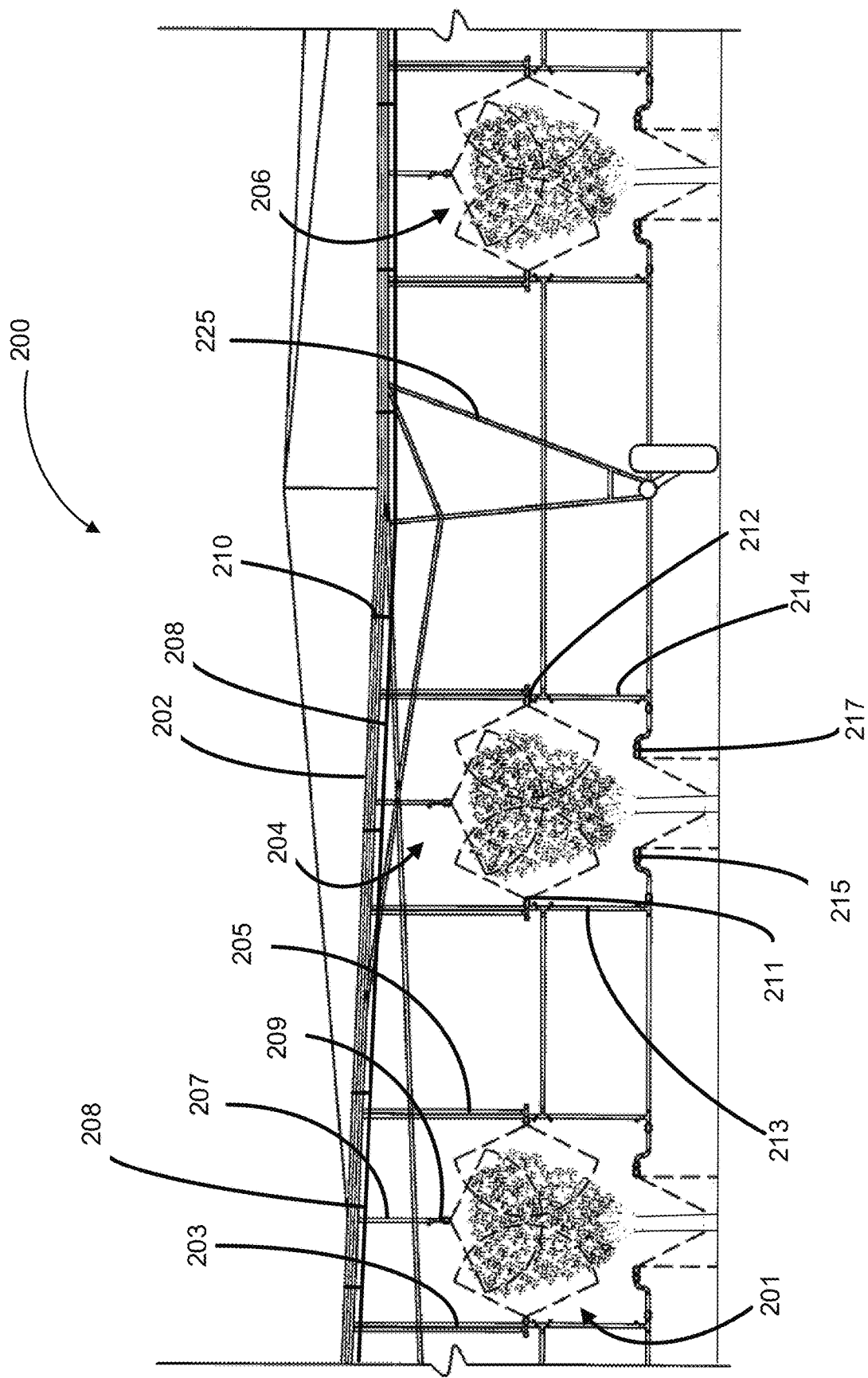
FIG. 2 shows a front view of an exemplary irrigation machine 200 in accordance with a first preferred embodiment of the present invention.
Figure 3:
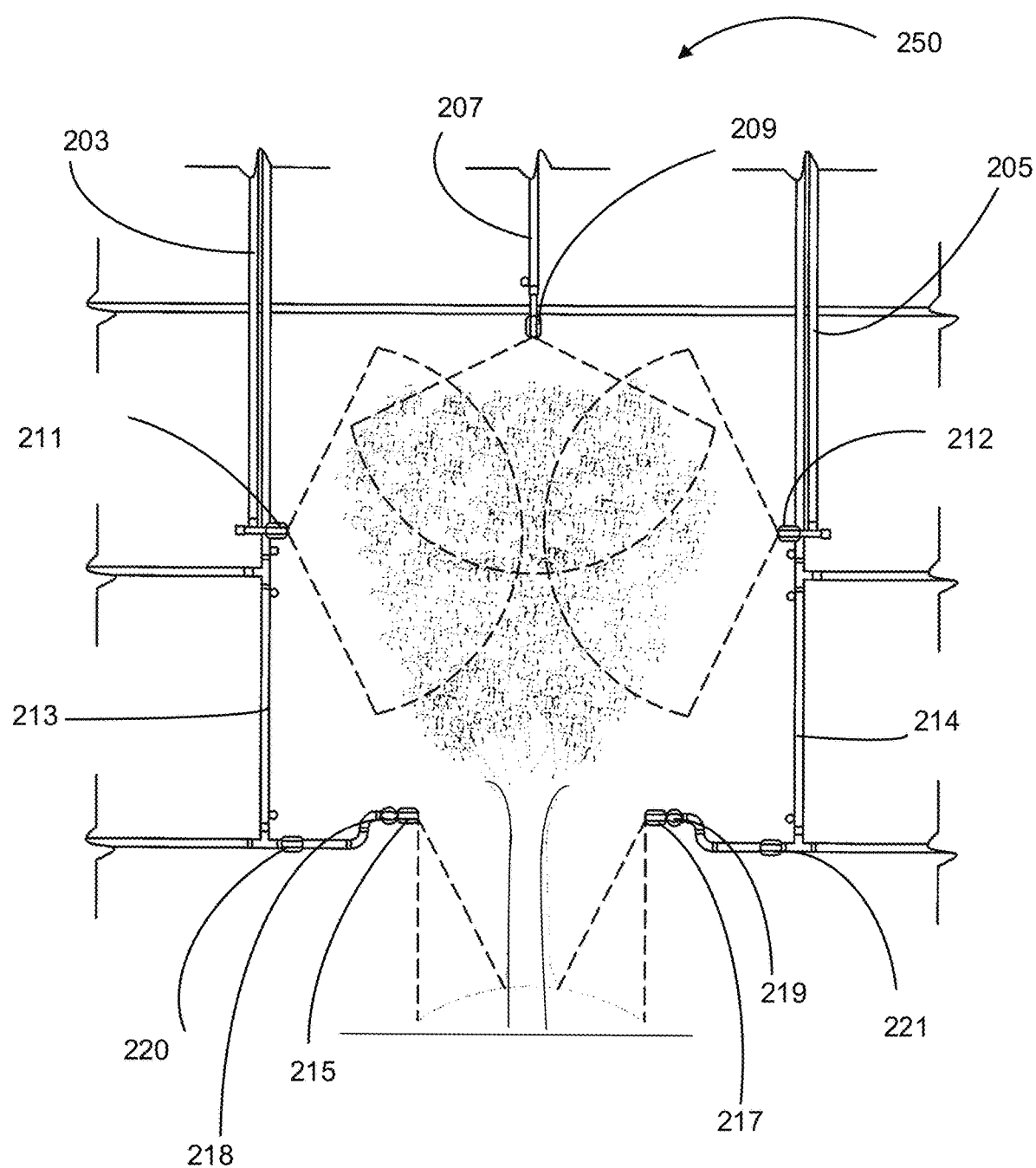
FIG. 3 shows a front view of an exemplary spray station 250 in accordance with a preferred embodiment of the present invention.
Figure 4:
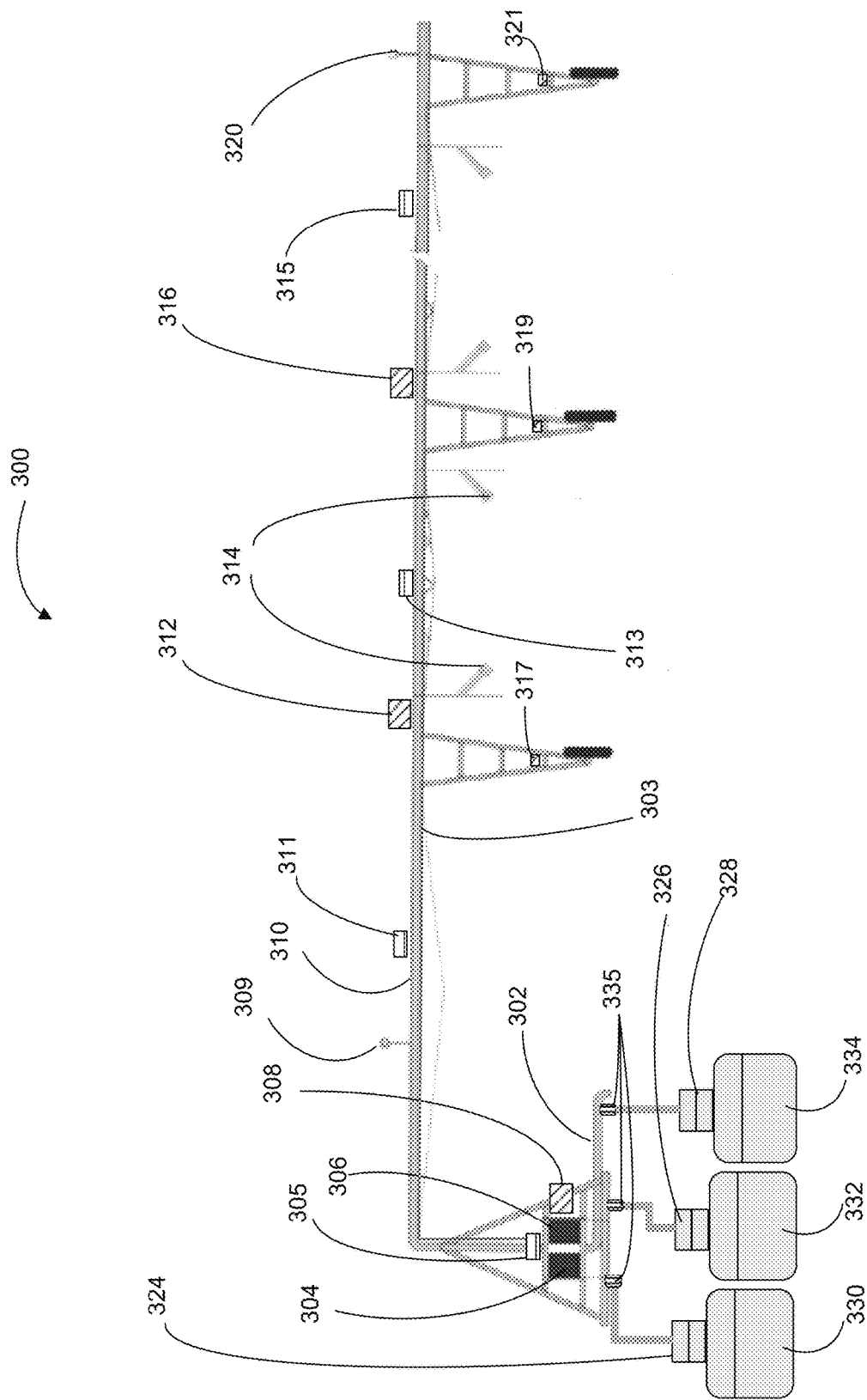
FIG. 4 shows a front view of an exemplary control and sensing system 300 in accordance with a preferred embodiment of the present invention.

With reference now to FIG. 2-4, the present invention teaches a system, method and apparatus for providing a specialized foliage spraying application. As should be understood, the irrigation systems discussed with respect to FIGS. 2-4 are exemplary irrigation systems into which the features of the present invention may be integrated. Accordingly, FIGS. 2-4 are intended to be illustrative and any of a variety of alternative systems (i.e. fixed systems as well as linear and center pivot self-propelled irrigation systems; stationary systems; corner systems and/or bender type systems) may be used with the present invention without limitation. Further, a variety of different motors and drive systems may be used with the present invention, and the arrangements shown in FIGS. 2-4 are not intended to limit the scope of the present invention in any way. According to alternative embodiments of the present invention, a single irrigation machine may use one or more drive towers in accordance with the present invention in combination with any of a variety of other types of drive towers (including unmotorized) without departing from the scope of the present invention.

With reference now to FIG. 2, an exemplary irrigation machine 200 in accordance with a first preferred embodiment of the present invention is illustrated. As shown, an exemplary span 200 may preferably include a main conduit 202 supported by at least one drive tower 225. Further, the exemplary span 200 may preferably include a main chemical supply line 208 attached to the bottom of the water supply line 202 via securing straps 210 or the like (as discussed further below). Preferably the main chemical supply line 208 connects to a number of spray stations 201, 204, 206 which are spaced along the length of the span 200 at given intervals. In this arrangement, each of the spray stations 201, 204, 206 may be identically arranged or they may have different combinations of lines, sprayers, emitters, valves and the like. For illustration, the spray stations 201, 204 and 206 shown in FIG. 2 are shown as identically arranged in an exemplary configuration to spray and treat rows of trees in an orchard or the like. Accordingly, various elements are labeled within each spray station 201, 204 and 206 which are duplicated and identical for every other spray station 201, 204 and 206 as illustrated.

As shown FIG. 2, each spray station 201, 204 and 206 preferably may include a left main body feeder line 203, an overhead feeder line 207, and a right main body feeder line 205 for transporting a given applicant to sprayer/emitter locations. Further, each spray station 201, 204 and 206 preferably may further include a left lower feeder line 213 and a right lower feeder line 214 for transporting and providing a flow of an applicant to ground spraying sprayers/emitters.

As further shown in FIG. 2, the left main body feeder line 203 preferably feeds a left body sprayer 211; the overhead feeder line 207 preferably feeds an overhead sprayer 209; and the right main body feeder line 205 preferably feeds a right body sprayer 212. As further shown in FIG. 2, each spray station preferably further includes a left ground sprayer 215 and a right ground sprayer 217 which are fed by the left lower feeder line 213 and a right lower feeder line 214 respectively.

According to preferred embodiments, the main chemical supply line 208 may preferably be attached to the water supply line 202 in a number of ways. For example, according to preferred embodiments, the main chemical supply line 208 may preferably be attached with an "S-hook" style strap 504 as shown in FIGS. 5A-6B.

With reference now to FIGS. 5A-5B, two exemplary connection systems in accordance with preferred embodiments of the present invention are provided. As shown in FIG. 5A, in a first configuration 502, the strap 504 may preferably be formed as a band (or the like) which wraps around both pipes 202, 208 and which allows the chemical supply line 208 to hang from the water supply line 202. According to a further preferred embodiment, the strap 504 may preferably include three holes with one on either end and one in the middle so that the strap 504 may wrap around both pipes 202, 208 and be secured with one central bolt 506 (or the like) to minimize movement or sway between the two secured pipes 202, 208.

Figure 6B:
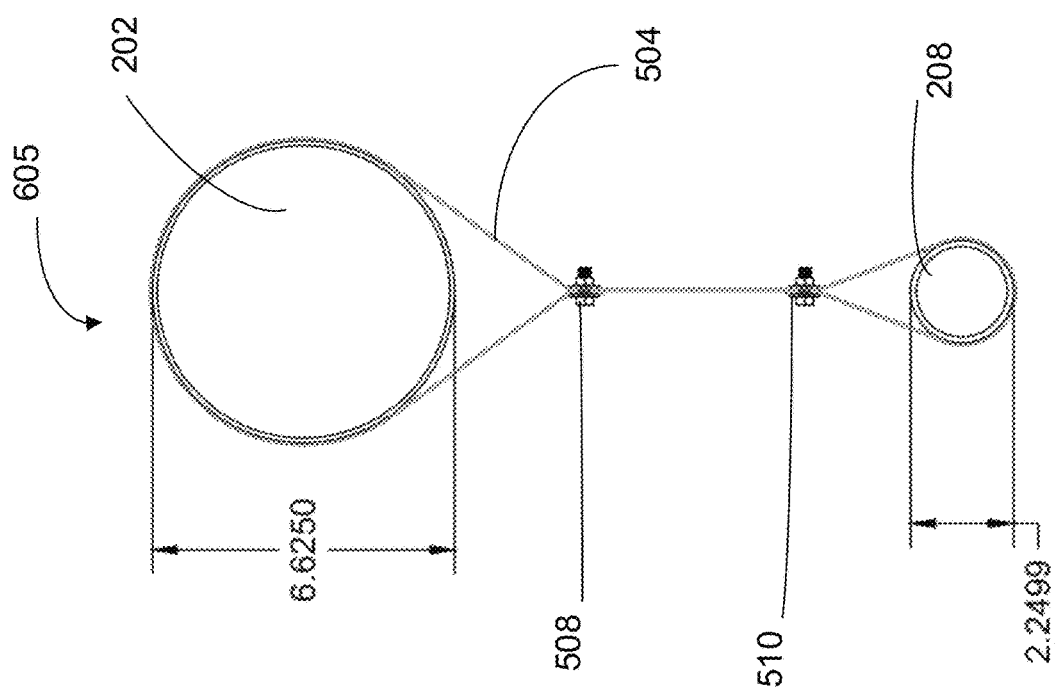
FIGS. 6A-6B show two further examples of the connections systems shown in FIGS. 5A-5B.
Figure 6A:
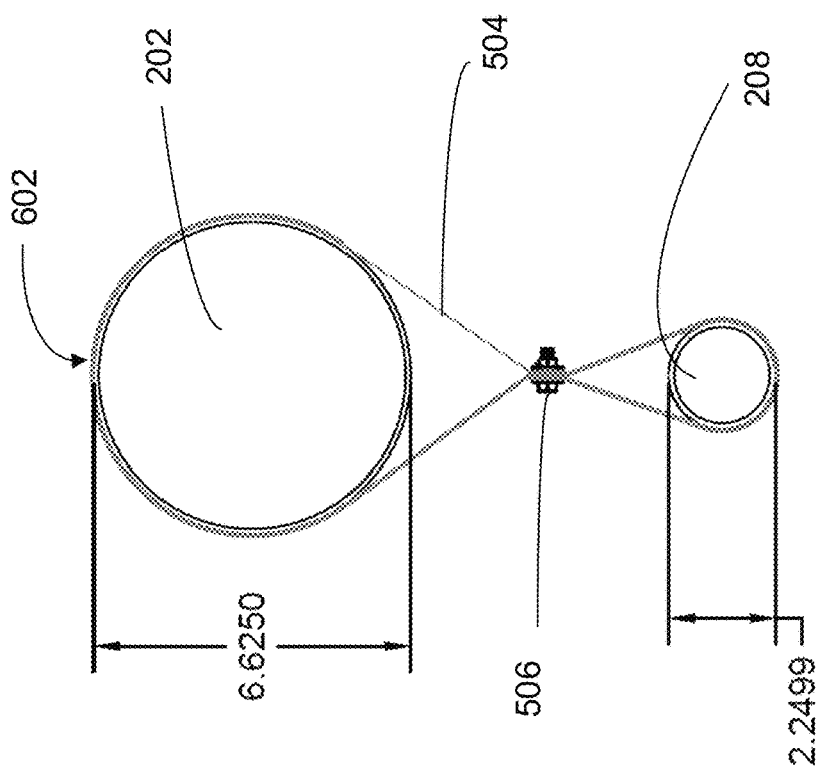

As further shown in FIG. 5B, in a second configuration 505, multiple securing bolts 508, 510 (as well as tie downs, welds or the like) may alternatively be used to secure the two pipes 202, 208 within the strap 504. According to this preferred embodiment, the two bolts 508, 510 may preferably allow for easier installation and a less concentrated fatigue point. In the two-bolt configuration 505, the strap 504 may preferably include four bolt holes to allow for the needed bolts 508, 510 to extend through the strap 504. As shown in FIGS. 6A and 6B, the strap 504 of the present invention may preferably be adjusted to accommodate a variety of different pipe diameters and different span-pipe 202 to underslung-pipe 208 distances.

With reference now to FIG. 3, an exemplary spray station 250 in accordance with a preferred embodiment of the present invention is illustrated. As shown in FIG. 2, the exemplary spray station 250 preferably may include a left main body feeder line 203, an overhead feeder line 207, and a right main body feeder line 205 for transporting a given applicant to given sprayer/emitter locations. Further, the exemplary spray station 250 preferably may include a left lower feeder line 213 and a right lower feeder line 214 for transporting and providing a flow of an applicant to ground spraying sprayers/emitters.

As further shown in FIG. 3, the left main body feeder line 203 preferably feeds a left body sprayer 211; the overhead feeder line 207 preferably feeds an overhead sprayer 209; and the right main body feeder line 205 preferably feeds a right body sprayer 212. As further shown in FIG. 3, each spray station preferably further includes a left lower feeder line 213 and a right lower feeder line 214 which feed a left ground sprayer 215 and a right ground sprayer 217 respectively. As further shown, each respective feeder line may include transducers 220, 221 and pressure regulating valves 218, 219 to monitor and adjust the flow of applicants through each conduit in the system.

With reference now to FIG. 4, an exemplary control and sensing system 300 incorporating aspects of the present invention shall now be discussed. For the sake of clarity, the spraying systems (i.e. water lines, sprayers, nozzles, valves etc.) are not shown. However, it should be understood that the elements and features illustrated in FIGS. 2 and 3 and referred to above are intended to be incorporated with the control and sensing elements shown in FIG. 4 and as discussed herein below.

With reference now to FIG. 4, an exemplary system 300 further incorporating aspects of the present invention shall now be further discussed. As shown, the system 300 may preferably be attached to a water source 302 or the like to supply water or applicants under pressure to the irrigation system 300. Additionally, the system may preferably be able to receive water, chemicals and other applicants under pressure from a variety of tanks (or reservoirs) 330, 332, 334 which may preferably be selectively provided to the system 300 via individual injection pumps 324, 326, 328 and control valves 335. Preferably, the pumps 324, 326, 328 may be selectively controlled along with the individual valves 335 to control the input of chemicals and other applicants into the system. Preferably, the valves 335 may be non-return valves, reduced pressure backflow preventers or the like and may include solenoids to allow for the individual control of each valve. As further shown, an exemplary irrigation system 300 may include combinations of transducers 312, 316 and control valves 305, 311, 313, 315 which respectively monitor and control the water and/or chemical and/or applicant pressures delivered to each spray station 250 (shown in FIG. 3). According to preferred embodiments, the valves and/or solenoids used for flow rate may be controlled by a control system which may transmit signals via using pulse width modulation (PWM) or a similar signal transmission technique.

According to further preferred embodiments of the present invention, the water is preferably transported from the water source 302 to selective sprayers via a main span 310. Preferably, the main span 310 is fluidly separate from chemical supply lines 303 used to supply other applicants such as chemicals received from individual injection pumps 324, 326, 328. According to further preferred embodiments, the chemical supply lines 303 are preferably dedicated so that all the chemical pipes and chemical sprayers (shown in FIG. 3) are fluidly separate from the main water conveyance pipeline used by the irrigation sprinkler package. According to further preferred embodiments, brackets or other hanging devices (as discussed above) may attach the chemical transmission lines to selected water pipelines. Still further, the system preferably may be configured to allow for a complete flush/evacuation of dedicated chemical lines to purge conduits following a chemical application. According to further preferred embodiments, the dedicated chemical transmission lines and distribution sprayers/emitter/drops may preferably be formed of materials which are resistant to chemical and UV exposure.

Further, the system 300 of the present invention may preferably further include a controller 304 as well as elements such as a GPS receiver 320 for receiving positional data and a flow meter 306 for monitoring water flow in the system. Still further, a system of the present invention may further include indirect crop sensors 314 which may preferably include moisture sensors to determine the water content levels in a given area of soil. Additionally, the sensors 314 may further include optics to allow for the detection of crop type, stage of grown, health, presence of disease, rate of growth and the like. Still further, the system may include soil or plant sensors (not shown). Still further, the detection system may further receive data from a connected or remote weather station (not shown) or the like which is able to measure weather features such as temperature, solar radiation, humidity, wind speed, wind direction, pressure, precipitation, temperature and the like. Still further, the system may preferably further include a wireless transceiver/router 308 for receiving and transmitting signals between system elements.

According to alternative preferred embodiments, the system may also use a power line carrier system or separate wired network to transmit signals between system elements. Further, the preferred system of the present invention may alternatively further include additional elements mounted to the span 310 such as additional sensors and the like. According to a further preferred embodiment, a system in accordance with the present invention may preferably further include one or more integrated sensor suite elements 309 which preferably include a combination of sensors and processing elements within a common housing. According to a further preferred embodiment, a system in accordance with the present invention may preferably further include high speed, constant move center-drive motors (such as switched reluctance motors (SRMs) or the like) to propel the irrigation structure through the cultivation area at speeds greater than 27 ft/min.

With reference to FIGS. 2-4, the operations of the control systems of the present invention shall now be further discussed. In operation, the controller 304 preferably includes software modules to allow for the execution of irrigation and chemical spray patterns according to specific prescriptions for each crop being sprayed. According to preferred embodiments, the controller 304 may further preferably use data from each sensor in the irrigation system (i.e. GPS, weather, and plant sensors) and execute or determine instructions to allow for selective, variable rate foliar chemical application (VRFC) for each specific crop, plant and/or tree. For example, the system of the present invention may receive sensor data and determine that a specific tree needs a specific amount of watering and a specific pesticide for its foliage. In response, the controller 304 may instruct elements of the irrigation system to initiate watering through the watering system to apply water through the lower feeder lines 213, 214 and ground sprayers 215, 217. At the same time, the controller 304 may instruct elements (i.e. valves, pumps, regulators) of the chemical delivery system to provide a pesticide from a storage tank 330 via an injection pump 324 and a control valve 335 which is then directed through the overhead feeder line 207 and out through an overhead sprayer 209. Still further, the controller 304 may control groups or individual emitters as required for each application.

In this way, the systems of the present invention may preferably switch between water irrigation and foliar chemical applications. Further, the systems of the present invention may provide water irrigation and foliar chemical applications simultaneously. For instance, continuing the example of the preceding paragraph, while the ground sprayers 215, 217 are emitting water and the overhead sprayer 209 is applying a pesticide, the right and left body sprayers 211, 212 may apply a herbicide from a different chemical tank 332. Still further, the right body sprayer 212 may spray a herbicide from a first chemical tank 332 while the left body sprayer 211 may spray a fungicide from a second chemical tank 334. Still further, the system may preferably be controlled so that chemicals may be mixed in the system with water at a controlled variable rate so that target water and chemical dilutions may be achieved along with varying chemical flow rates. Still further, the system may preferably further include variable rate drive units 317, 319, 321. According to a further preferred embodiment, the drive units 317, 319, 321 may preferably be high-speed constant move drive units. According to a further preferred embodiment, the controller may further control the speed of the drive units 317, 319, 321 to lower minimum application amounts if needed for certain chemical applications.

According to further preferred embodiments, the system of the present invention may further include rate control algorithms to prevent and/or track when specific areas of foliage do not receive the proper chemical applications for whatever reason (i.e. due to wind conditions, chemicals running out, improper cycling of emitters etc.).

According to further preferred embodiments, sensors could be attached to specific spans and locally control adjoining drive units. Still further, the sensors of the present invention may be integrated into a larger system that operates and controls the entire irrigation system and/or individual ancillary devices (i.e. pump, power supply, etc.). Further these sensors could act in concert with other machine or field condition sensors via a central operational controller utilizing complex algorithms or machine learning to control machine operations or to provide data for controlling other operational aspects of the irrigation machine.

The scope of the present invention should be determined not by the embodiments illustrated, but by the appended claims and their legal equivalents.

What is claimed is:

1. A system for use with an irrigation system having at least one span and a drive system for moving the span, wherein the system comprises:

a first applicant flow system for moving an applicant from a first repository to a first dispersal system; wherein the first repository is connected to the first applicant flow system through a first valve; wherein the first repository contains a first chemical;

a second applicant flow system for moving an applicant from a second repository to a second dispersal system; wherein the second repository is connected to the second applicant flow system through a second valve; wherein the second repository contains a second chemical;

a third applicant flow system for moving water from a water supply source to a third dispersal system; wherein the water supply source is connected to the third applicant flow system through a third valve;

a plurality of sensors;

a programmable logic device (PLD), wherein the PLD is configured to analyze sensor data from the plurality of sensors to determine a foliar property of a scanned crop; and a control system, wherein the control system is configured to control the first valve, the second valve and the third valve; wherein the control system is configured to open and close the first valve to modify a flow of the first chemical into the first applicant flow system; wherein the control system is configured to open and close the second valve to modify a flow of the second chemical into the second applicant flow system; wherein the controller is further configured to open and close the third valve to modify a flow of water into the third applicant flow system;

wherein the PLD is configured to determine whether a foliar property satisfies a first precondition; wherein the PLD is configured to open the first valve to allow the first chemical to be disbursed through the first dispersal system based on the detected first precondition;

wherein the PLD is configured to determine whether a foliar property satisfies a second precondition; wherein the PLD is configured to open the second valve to allow the second chemical to be disbursed through the second dispersal system based on the detected second precondition;

wherein the PLD is configured to determine whether a foliar property satisfies a third precondition; wherein the PLD is configured to open the third valve to allow the water to be disbursed through the third dispersal system based on the detected third precondition.

2. The system of claim 1, wherein the system further comprises a plurality of environmental sensors;

wherein the plurality of environmental sensors are configured to detect one or more environmental conditions selected from the group of environment conditions comprising: humidity, pressure, precipitation, solar radiation, and temperature.

3. The system of claim 1, wherein the system further comprises an image sensor.

4. The system of claim 1, wherein the system further comprises a sensor selected from the group of sensors comprising: a spectrometer, an infrared sensor and an optical sensor.

5. The system of claim 1, wherein the controller is configured to open and close the first, second or third valves based on an inputted irrigation schedule.

6. The system of claim 3, wherein the group of sensors comprise at least one sensor configured to monitor crop health using an RGB image.

7. The system of claim 3, wherein the group of sensors comprise at least one sensor configured to monitor crop health using spectrophotometric images.

8. The system of claim 3, wherein the PLD is configured to selectively open the first, second and third valves based on environmental data.

9. The system of claim 3, wherein the PLD is configured to selectively open the first, second and third valves based on image data.

10. The system of claim 8, wherein the environmental data is selected from the group of environmental data comprising: temperature, humidity, sunlight and precipitation.

11. The system of claim 8, wherein the PLD is configured to selectively open the first, second and third valves based on a forecast of environmental conditions.

12. The system of claim 8, wherein the PLD is configured to selectively open the first, second and third valves based on detected precipitation.

13. The system of claim 8, wherein the PLD is configured to selectively open the first, second and third valves based on detected temperatures.

14. The system of claim 8, wherein the PLD is configured to selectively open the first, second and third valves based on a detected crop growth rate.

15. The system of claim 8, wherein the PLD is configured to selectively open the first, second and third valves based on a vegetation index; wherein the vegetation index is selected from the group comprising: the RVI (ratio vegetation index), the NDVI (normalized difference vegetation index), the SAVI (soil-adjusted vegetation index), the MASVI (modified soil-adjusted vegetation index) and the RSR (reduced simple ratio index).

16. The system of claim 8, wherein the PLD is configured to dilute the first chemical based on a fourth detected precondition.

17. The system of claim 16, wherein the PLD is configured to dilute the second chemical based on a fifth detected precondition.

18. The system of claim 1, wherein the controller is configured to control the first valve to apply the first chemical on a first area of a first plant; wherein the controller is configured to control the second valve to apply the second chemical on a second area of the first plant; and further wherein the controller is configured to control the third valve to apply water to the first plant.

\* \* \* \* \*